US012588061B2

(12) United States Patent
Hart et al.

(10) Patent No.: US 12,588,061 B2
(45) Date of Patent: Mar. 24, 2026

(54) SLOT SYNCHRONIZATION FOR STATIONS IN OVERLAPPING BASIC SERVICE SETS

(71) Applicant: Cisco Technology, Inc., San Jose, CA (US)

(72) Inventors: Brian D. Hart, Sunnyvale, CA (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 18/188,263

(22) Filed: Mar. 22, 2023

(65) Prior Publication Data

US 2024/0015789 A1    Jan. 11, 2024

Related U.S. Application Data

(60) Provisional application No. 63/368,021, filed on Jul. 8, 2022.

(51) Int. Cl.
H04W 74/0816 (2024.01)
H04W 74/08 (2009.01)

(52) U.S. Cl.
CPC ... H04W 74/0816 (2013.01); H04W 74/0891 (2013.01)

(58) Field of Classification Search
CPC ......... H04W 74/0816; H04W 74/0891; H04W 56/001; H04W 56/003
See application file for complete search history.

(56) References Cited

U.S. PATENT DOCUMENTS

2015/0049730 A1    2/2015  Merlin et al.
2015/0245335 A1    8/2015  Zhou et al.

2018/0279171 A1 *  9/2018  Matsuo ................. H04L 5/0007
2020/0029363 A1    1/2020  Choi et al.
2020/0329444 A1    10/2020 Cao et al.
(Continued)

FOREIGN PATENT DOCUMENTS

WO         2022118135 A1     6/2022

OTHER PUBLICATIONS

MohanraJ, "Wireless Network: Module Contents," Date Accessed: Mar. 17, 2023, pp. 1-22.

(Continued)

*Primary Examiner* — Sudesh M. Patidar

(74) *Attorney, Agent, or Firm* — Patterson + Sheridan, LLP

(57) ABSTRACT

Described herein are systems and methods for reducing collisions in a wireless network with overlapping basic service sets by synchronizing contention slots among stations (access points or non-access point clients), some of which are out of range, competing for the use of the wireless medium. In some embodiments, the contention slots of competing stations are synchronized by controlling the time of transmission and the time of the spacing between frames to be an integer multiple of the time of a contention slot. In some embodiments, slot boundaries are enforced by controlling guard intervals or by trigger-based uplink communications. In other embodiments, a central network controller, such as a network controller, synchronizes slots when an access point or station joins the wireless network or uses a neighbor discovery protocol among access points. The contention slots are synchronous in all cases throughout the overlapping basic service sets.

20 Claims, 14 Drawing Sheets

(56)         References Cited

U.S. PATENT DOCUMENTS

| 2021/0315025 | A1* | 10/2021 | Seok | H04W 74/0808 |
| 2021/0344540 | A1* | 11/2021 | Park | H04L 27/2603 |
| 2021/0360547 | A1 | 11/2021 | Wentink et al. | |
| 2022/0053441 | A1 | 2/2022 | Seok et al. | |
| 2022/0086808 | A1 | 3/2022 | Monajemi et al. | |
| 2022/0312506 | A1* | 9/2022 | Xia | H04W 74/0891 |
| 2022/0386272 | A1* | 12/2022 | Omer | H04W 4/33 |
| 2023/0199690 | A1* | 6/2023 | Smith | H04W 56/009 |
| | | | | 370/337 |
| 2024/0224257 | A1* | 7/2024 | Sun | H04W 72/20 |

OTHER PUBLICATIONS

Author Unknown, "High Efficiency PPDU—Enterprise Wireless Local Area Network Architectures and Technologies," Ebrary.net, Date Accessed: Feb. 27, 2023, pp. 1-19.
International Search Report and Written Opinion for International Application No. PCT/US2023/069513, mailed Oct. 20, 2023, 13 Pages.

* cited by examiner

FIG. 2B

SLOT SYNCHRONIZATION FOR STATIONS IN OVERLAPPING BASIC SERVICE SETS

CROSS-REFERENCE TO RELATED APPLICATIONS

This application claims the benefit of U.S. provisional patent application Ser. No. 63/368,021 filed Jul. 8, 2022. The aforementioned related patent application is herein incorporated by reference in its entirety.

TECHNICAL FIELD

Embodiments presented in this disclosure generally relate to the link layer of wireless networking. More specifically, embodiments disclosed herein include the operation of carrier sense, multiple access, collision avoidance (CSMA/CA) in IEEE 802.11.

BACKGROUND

When access points and stations in a wireless network need to obtain the wireless medium to communicate, they contend for the medium using CSMA/CA. In this protocol, if a station or access point senses an idle channel, it waits for a short time and then transmits a frame. If the channel is not idle, then the station or access point waits until the channel is idle and then waits a random amount of time (called the backoff time) before attempting to send a frame. Because each station or access point has a different backoff time value, it is unlikely that the backoff time expires for each station at the same time if the stations are synchronized initially. However, if the stations or access points fall out of synchronization, the chance of collision increases because the backoff times are not synchronous. The collision of a desired transmitted physical protocol data unit (PPDU) with another transmitted PPDU often corrupts some or all of the frames in the desired transmitted PPDU at the receiver and requires that the incorrectly received frames in the collided desired PPDU be resent to the receiver. The collision and the retransmission of any incorrectly received frames waste valuable bandwidth and time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 2B depicts the formats for high-efficiency (HE) PPDUs.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
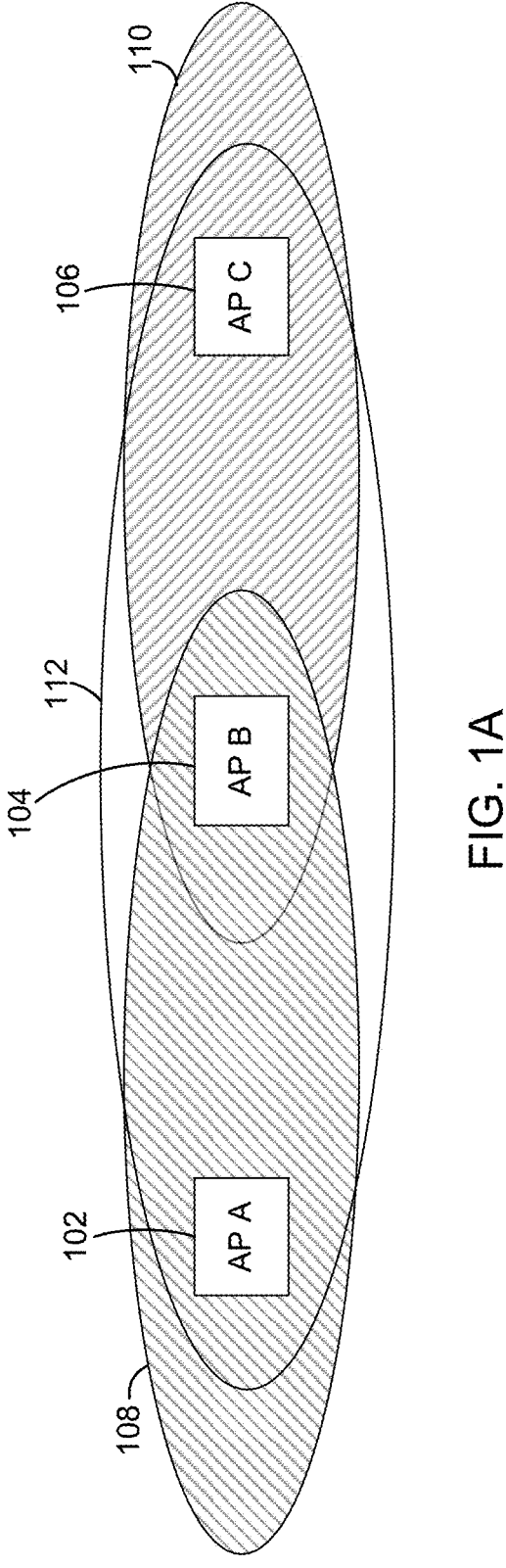
FIG. 1A depicts an arrangement of a number of basic service sets (BSSs).

One embodiment presented in this disclosure is a method of maintaining slot synchronization among a plurality of access points (APs) and non-AP stations connected to a wireless medium. The method includes selecting durations of PPDUs within a transmission opportunity (TXOP) and durations of interframe spacing times within and following the TXOP so that a sum of the durations of the PPDUs and the interframe spacing times is an integer multiple of a slot time, and initiating transmission of the TXOP with the selected durations over the wireless medium from one of the plurality of stations.

Another embodiment presented in this disclosure is an access point for maintaining slot synchronization. The access point includes a processor and a memory coupled to the processor, the memory containing instructions, which, when executed by the processor, cause the access point to: select durations of PPDUs within a transmission opportunity (TXOP) and durations of interframe spacing times within and following the TXOP so that a sum of the durations of the PPDUs and the interframe spacing times is an integer multiple of a slot time, and initiate transmission of the TXOP with the selected durations over a wireless medium to one of a plurality of stations coupled to the wireless medium.

Yet another embodiment presented in this disclosure is a non-transitory computer-readable medium encoding instructions, which, when executed by a processor of an access point coupled to a wireless medium, cause the access point to: select durations of PPDUs within a transmission opportunity (TXOP) and durations of interframe spacing times within and following the TXOP so that a sum of the durations of the PPDUs and the interframe spacing times is an integer multiple of a slot time, and initiate transmission of the TXOP with the selected durations over the wireless medium to one of a plurality of stations.

In addition, each non-AP STA implements the steps described in paragraph 22.

EXAMPLE EMBODIMENTS

Communication over a medium is more complex when the medium is shared compared to when the medium is not shared. Examples are local area networks such as early versions of Ethernet, in which the shared medium is a physical cable, or a wireless network, in which the shared medium is a radio frequency band. The data link layer in the networking protocol stack adds a special sublayer called the medium access sublayer (MAC) to deal with the shared medium. The MAC layer implements a protocol that determines when the shared medium is occupied, whether the shared medium is idle, and how to detect when two or more agents (i.e., stations) use the medium simultaneously and thus collide. In the case of a wireless network, the protocol used for sharing medium is called carrier sense multiple access collision avoidance (CSMA/CA). It is important to avoid collisions in a wireless network because a collision corrupts the transmitted data, leading to each colliding agent retrying their transmissions. The MAC level protocol attempts to avoid another collision by having each agent randomly select a particular time slot after the corrupted transmission at which each agent is allowed to retry its transmission. This protocol works well when the agents sharing the medium can listen to each other. However, if some agents are out of radio range with other agents, more collisions are likely because the time slots for retrying transmission may fall out of synchronization after a transmission. Thus, a time slot selected by one agent for a retry may not be different from a time slot selected by another agent because the time slots are not aligned.

It is common for some stations in a basic service set (BSS) to be out of range with stations in another overlapping BSS (OBSS), where the term station refers to an access point or a non-access point client. When transmission of arbitrary length occurs between two stations in range of each other, an out-of-range station in the OBSS cannot detect the transmission. Thus its backoff contention slots, which were initially synchronized with the two stations, lose synchronism with those of the two communicating stations, thereby increasing the likelihood of collisions among the stations. However, as described below, adjusting the transmission parameters between the two communicating stations keeps the backoff contention slots of the out-of-range station synchronized with the other two stations, thus reducing collisions.

FIG. 1A depicts an arrangement of a number of basic service sets (BSSs). BSS A 108 with access point (AP) A 102 is in the range of BSS B 112 with AP B 104 and BSS C 110 with AP C 106 is in the range of BSS B 112 with AP B 104. However, access points or stations in BSS A 108 and BSS C 110 are out of range. After a station in BSS B 112 transmits, its transmission is heard by all stations in all BSSs.

Figure 1B:
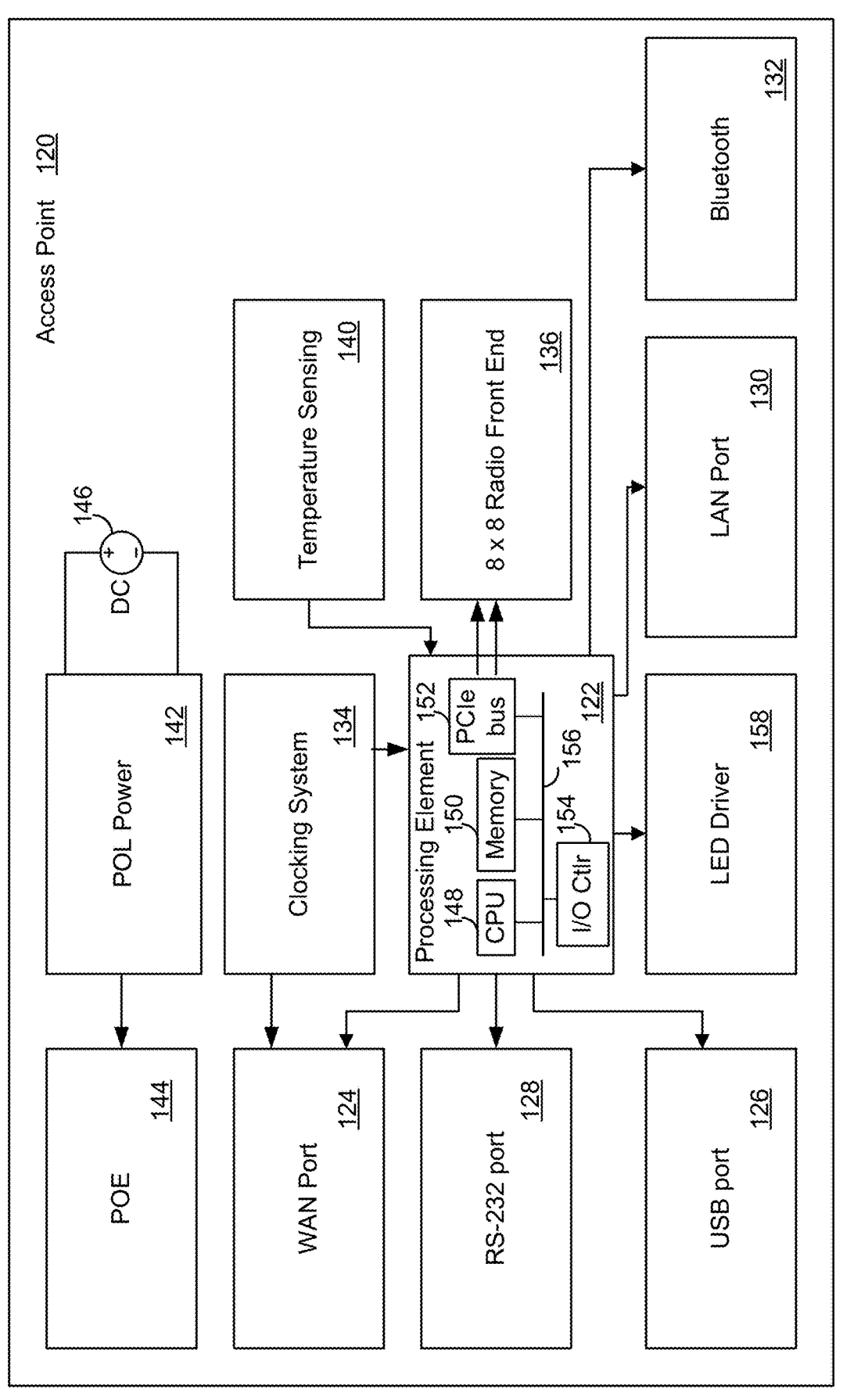
FIG. 1B depicts a representative architecture of an access point.

FIG. 1B depicts a representative architecture of an access point. The access point 120 includes a processing element 122 and several ports or connection facilities, such as a WAN port 124, USB port 126, RS-232 port 128, LAN port 130, and Bluetooth 132. Also included are a clocking system 134 and an 8×8 radio front-end 136 with a transmitter and receiver, which are coupled to eight external antennas. Auxiliary modules include a temperature sensing module 140, a power module 142 connected to a DC power source 146, a power over Ethernet (POE) module 144, and LED driver 158. Processing element 122 includes a CPU 148 and memory 150, a peripheral control interconnect express (PCIe) bus controller 152 for connecting to the radio front end 136, and an I/O controller 154, all coupled to each other via bus 156.

Figure 1C:
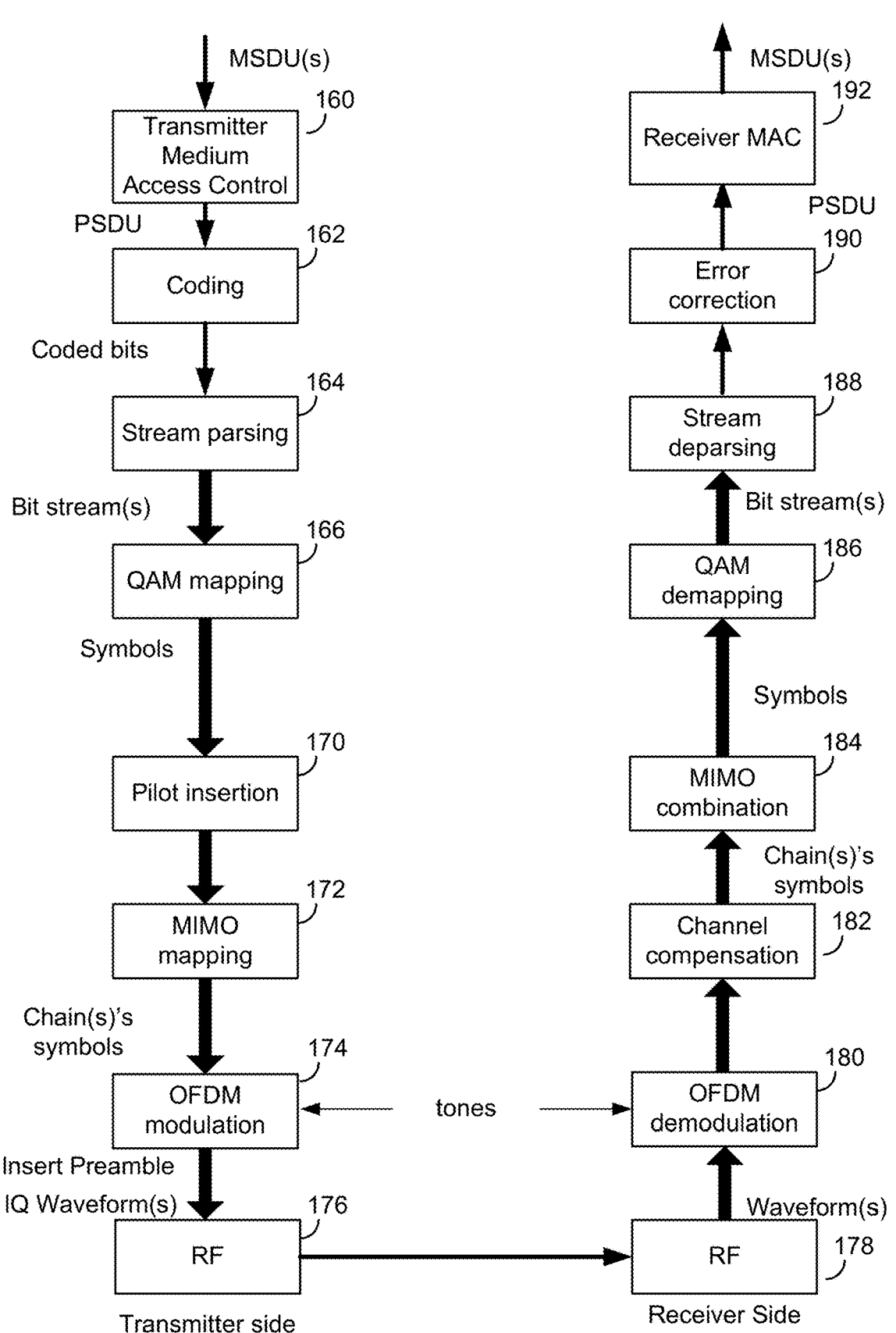
FIG. 1C depicts an example transmitter-receiver chain of the radio front end.

FIG. 1C depicts an example transmitter-receiver chain of the radio front end of an access point or station. On the transmitter side, this chain determines the lengths of PPDUs in a TXOP, contends for transmission, and sends each PPDU in the TXOP with the correct IFS spacing. The PPDU becomes IQ waveforms that are transmitted over a radio link between the transmitter and receiver. One or more MAC protocol data units (MSDUs) are first applied to a transmitter medium access control block 160, which forms a PSDU. The PSDU is applied to a coding block 162 that scrambles the bits and encodes them. The result is then passed to the stream parsing block 164, which divides the bits into spatial streams for transmission over multiple antennas. After the bit streams are formed, they are sent to the quadrature amplitude modulation (QAM) mapping block 166, which selects signals from the QAM constellation being used. Next, the pilot insertion block 170 adds pilot symbols to align parameters between the transmitter and receiver. After pilot symbol insertion, the symbols are applied to the MIMO mapping block 172, which maps spatial streams to the different antennas. Finally, the symbols are modulated in the OFDM modulation block 174 onto the various tones in a resource unit (RU) using an inverse fast Fourier transform (IFFT) of the symbols. The resulting IQ waveforms modulate in the RF block 176 a radio frequency (RF) carrier (usually 5 GHz).

On the receiver side, the transmitted RF waveform is demodulated back in the RF block 178 to its baseband, and the waveforms are applied to the OFDM demodulator block 180, which uses the fast Fourier transform (FFT) to return the symbols to the time domain. Next, the channel compensation block 182 compensates for frequency fading on some sub-channels. The recovered symbols are applied to the MIMO block 184 to recombine them and then to the QAM de-mapping block 186 to convert the symbols to bitstream data. The bit stream data is then applied to the stream de-parsing block 188 to recover the original spatial streams. The original spatial streams are then error-corrected in the error correction block 190 to become the originally sent physical data frame which is then applied to the receiver medium access control block (MAC) 192 to recreate one or more MSDUs.

Figure 1D:
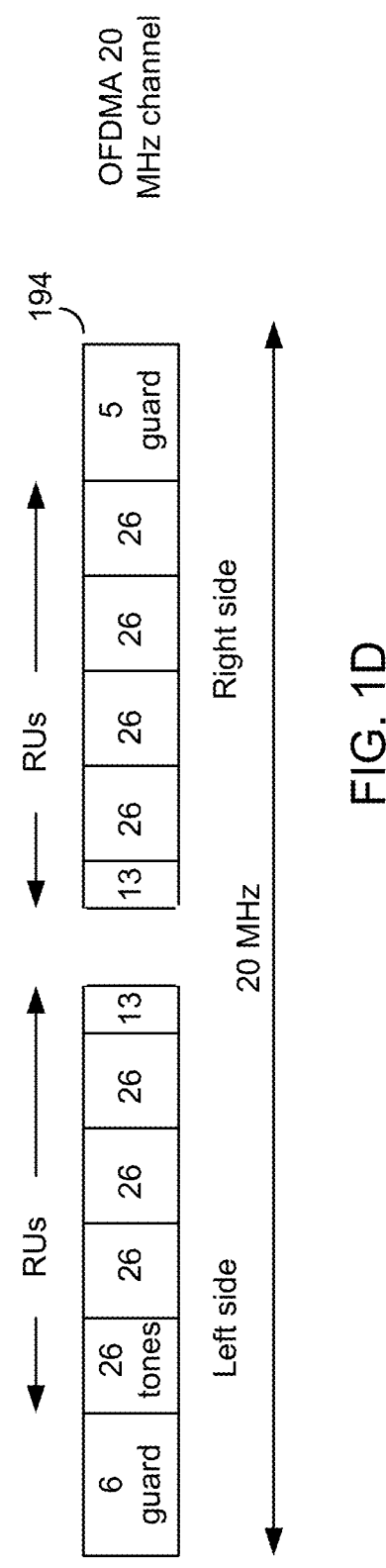
FIG. 1D depicts the arrangement of resource units for a 20 MHz orthogonal frequency division multiple access (OFDMA) channel.

FIG. 1D depicts the arrangement of resource units for a 20 MHz OFDMA channel. On the left side, channel 194 includes 6 guard tones, four sets of 26 tones with an adjacent 13 tones, each set of 26 tones being a resource unit (RU). The right side is the same, except for a five-tone guard band at the end. Thus, the 20 MHz bandwidth includes 9 channels. Including pilot signal tones and some null tones, the nine RUs use 242 tones.

PPDUs have a variety of formats depending on the transmitter-receiver chain, such as the one described above.

Figure 2A:
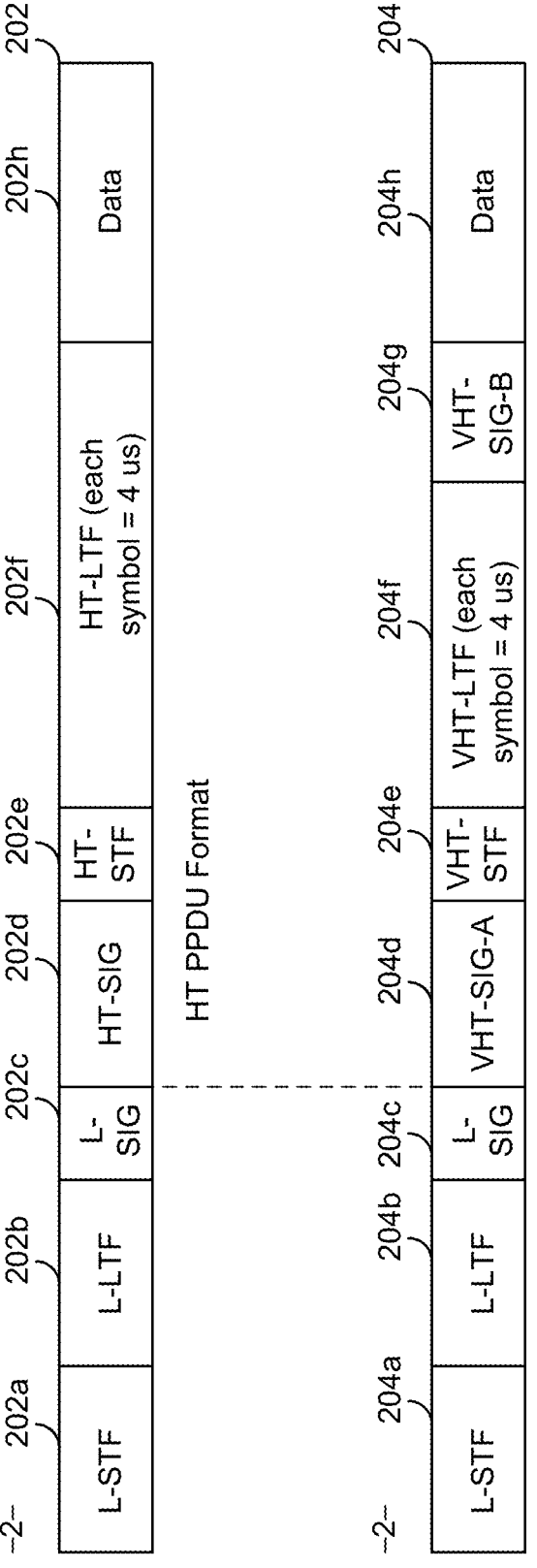
FIG. 2A depicts the formats for the high-throughput (HT) and very high throughput (VHT) PPDUs.

FIG. 2A depicts the formats for the high-throughput (HT) and very high throughput (VHT) PPDUs. The HT PPDU format 202 includes a legacy preamble 202a-c, a signal field (HT-SIG) portion 202d, a short training field (HT-STF) portion 202e, and a high-throughput, legacy long training field (HT-LTF) portion 202f, followed by the data 202h. The legacy preamble portion includes a legacy short training field (L-STF, 8 μs) 202a, a legacy long training field (L-LTF, 8 μs) 202b, and a legacy signal field (L-SIG, 4 μs) 202c. Each HT-LTF symbol 202f is 4 μs, and the number of these symbols can be varied to control the length of the PPDU.

The VHT PPDU format in FIG. 2A includes a legacy preamble 204a-c, a very high throughput signal A (VHT-SIG-A) 204d, a very high throughput short training field (VHT-STF) 204e, very high throughput long training (VHT-LTF) symbols 204f, and a very high throughput signal B (VHT-SIG-B) 204g followed by the data 204h. Similar to the HT format, each VHT-LTF OFDM symbol 204f is 4 μs, and the number of these symbols can be varied to provide a variable pad to the PPDU.

Figure 2B:
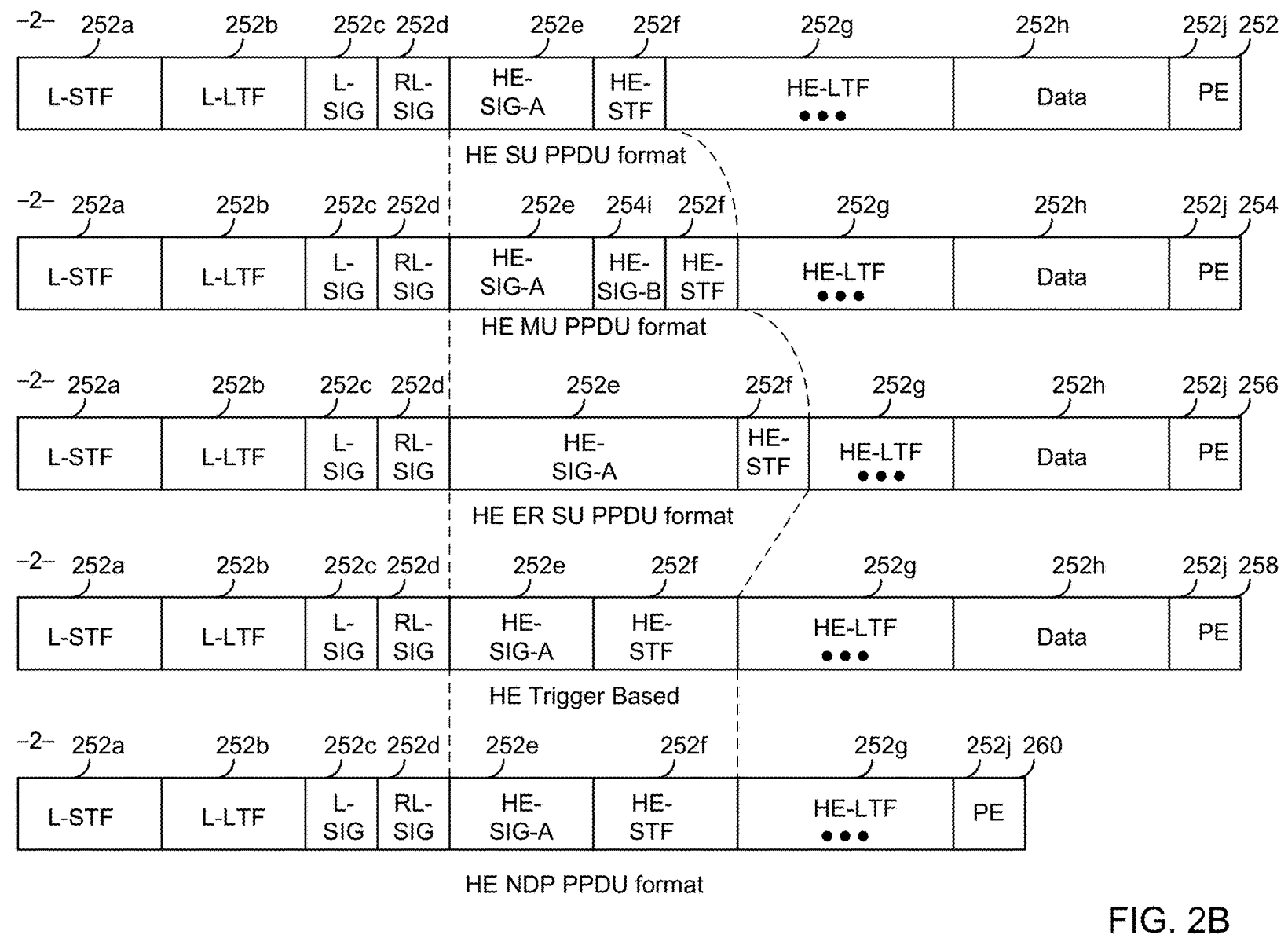

FIG. 2B depicts the formats for high-efficiency (HE) PPDUs. The HE PPDU format 252 includes a legacy preamble portion and a HE-preamble portion. The legacy preamble includes an L-STF (8 us) 252a, L-LTF (8 us) 252b, L-SIG (4 us) 252c, and a repeated legacy signal (RL-SIG, 4 us) 252d. The HE-preamble portion includes an HE-SIG-A (8 us) field 252e, an HE-STF (4 us) field 252f, and in one case, an HE-SIG-B (4 us/symbol) field 254i. Following these fields are a variable number of variable duration HE-LTF fields 252g, a data field 252h except for the null data packet (NDP) format, and a packet extension (PE) field 252j.

Figure 2C:
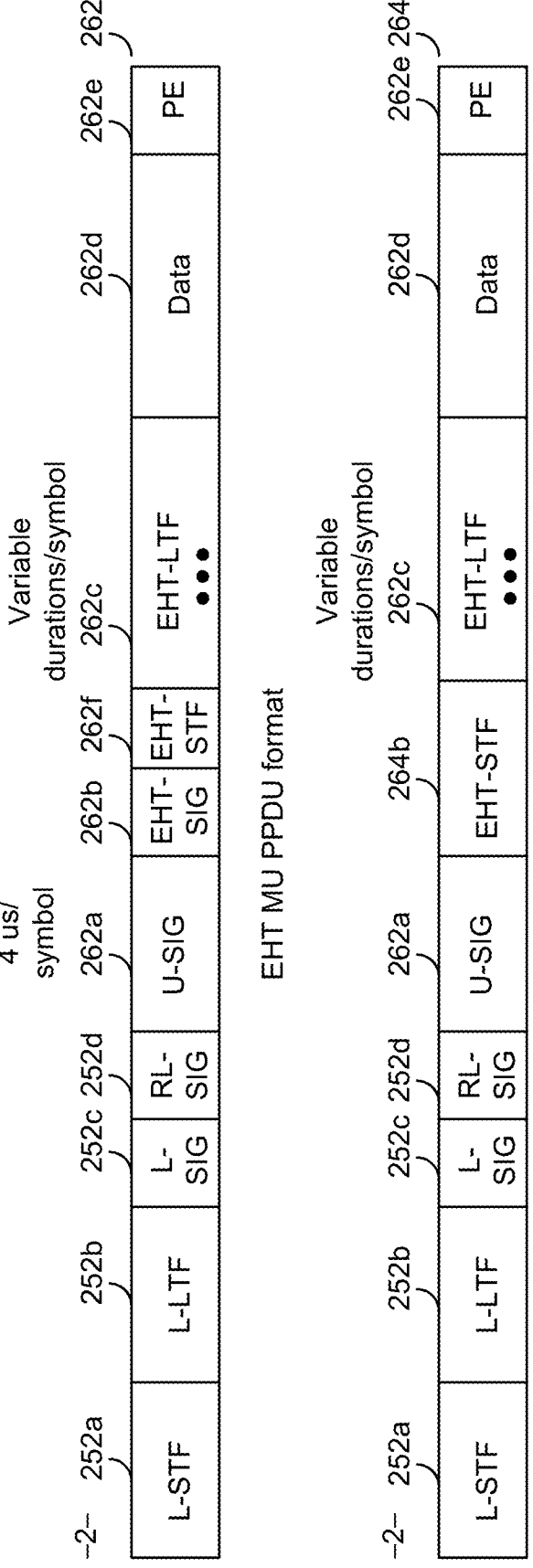
FIG. 2C depicts the formats for extremely high throughput (EHT) PPDUs.

FIG. 2C depicts the formats for EHT PPDUs. The format is similar to the HE PPDU. The EHT MU PPDU 262 includes an L-STF field 252a, an L-LTF field 252b, an L-SIG field 252c, and an RL-SIG field 252d. Following these fields are the universal signal (U-SIG) field 262a, EHT-SIG field 262b, EHT-STF field 262f, and EHT-LTF field 262c, which can have a variable number of symbols. Finally, following the data field 262d is PE field 262e. The EHT TB PPDU 264 is similar but does not include the EHT-SIG field 262b.

Figure 3:
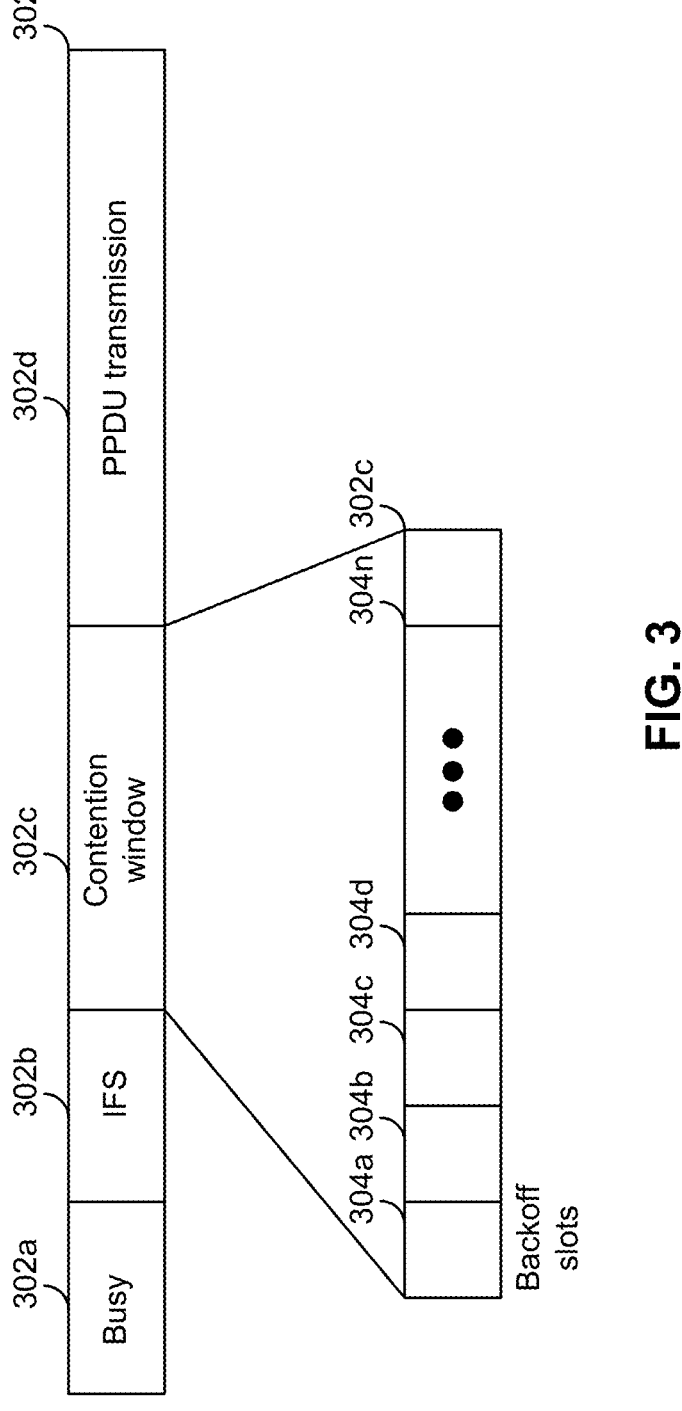
FIG. 3 depicts the interframe spacing relationships for a PPDU transmission.

FIG. 3 depicts the interframe spacing relationships for a frame transmission. During a first time in transmission 302, the channel is busy 302a, after which an interframe spacing (IFS) time 302b occurs. Following the interframe spacing time 302b is a contention window 302c, and then the PPDU transmission 302d.

The IFS time 302b may be a short interframe space (SIFS) (aka, short interframe spacing time) after the channel is busy, a point coordination function (PCF) interframe space (PIFS), a distributed coordination function (DCF) interframe space (DIFS), an arbitration interframe spacing (AIFS), or an extended interframe space (EIFS). The SIFS time is used between high-priority transmissions because it is a short time. High-priority transmissions can begin once the SIFS has elapsed. The PIFS is used by the point coordination function during contention-free operation. DIFS is the minimum medium idle time for contention-based services. Stations have immediate access to the medium if it has been free for a period longer than the DIFS. AIFS depends on the access category AC (i.e., AIFS=AIFSN[AC]*slot_time+SIFS, where AIFSN is the AIFS-number) and is the shortest for voice, shorter for video, longer for best effort and longest for background. EIFS is used only when there is an error in frame transmission.

The contention window 302c includes a number of backoff slots 304a-304n, where, in one embodiment, the number of slots is an integer power of 2-1 (i.e., $2^n-1$). The contention window increases by a factor of 2 each time a retransmission is performed, thereby providing a greater number of backoff slots.

A backoff slot 304a-304n can be medium dependent with higher-speed physical layers typically using shorter slot times. Stations select a random slot and wait for the selected slot before attempting to access the medium. When several stations attempt to transmit, the station that selects the lowest random number wins, and other nearby stations defer because they sense that the medium is idle.

Figure 4:
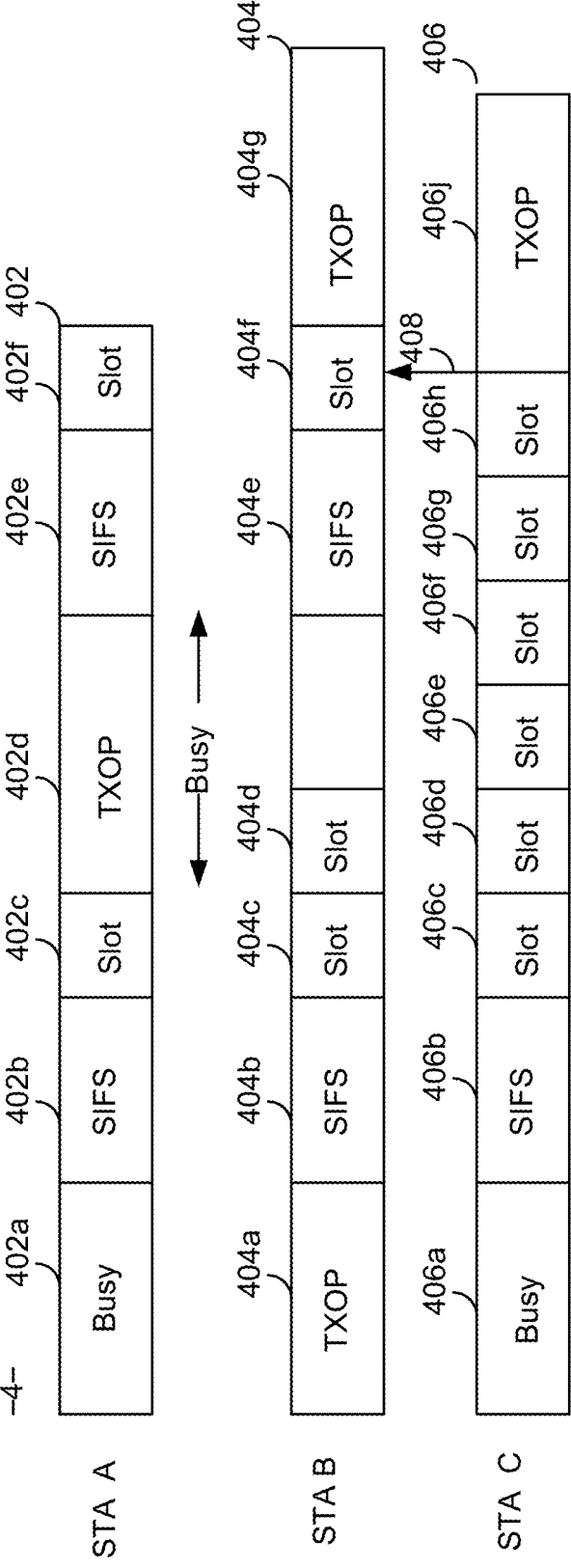
FIG. 4 depicts an example case of stations, as depicted in FIG. 2, in which a station in BSS C falls out of synchronism with a station in BSS A and a station in BSS B.

FIG. 4 depicts an example case of stations, as depicted in FIG. 2, in which a time sequence 402 for a station (STA) A in BSS A, a time sequence 404 for a STA B in BSS B, and time sequence 406 for a STA C in BSS C. In the figure, STA C falls out of synchronism with STA A and STA B, where stations are access points or non-access point clients. In the figure, slot times 402c, 404c, 406c are all aligned and in sync. The TXOP time 402d is preceded by a busy time 402a, a short interframe spacing time (SIFS) 402b, and a slot time 402c and is followed by a SIFS time 402e and a slot time 402f. STA B has a busy interval which includes a slot time 404d and is preceded by a TXOP time 404a, an SIFS time 404b and a slot time 404c and followed by an SIFS time 404e, a slot time 404f, and a TXOP time 404g. STA C has a busy interval 406a, followed by an SIFS time 406b, a number of slot times 406c through 406h, and a TXOP time 406j.

In time sequence 402, STA A transmits one or more physical protocol data units (PPDUs), during TXOP time 402d, to STA B. After the TXOP, STA A and STA B remain in synchronization with slot time 404f in sync. But STA C has fallen out of sync with STA A and STA B with slot times 406a-h ending somewhere in the middle 408 of slot time 404f because, as shown in FIG. 1, it is out of range with STA A and thus does not detect the TXOP time 402d. With its slot times out of sync (sometimes called unslotted) STA C makes it more likely that a collision in the backoff slots occurs later.

Figure 5:
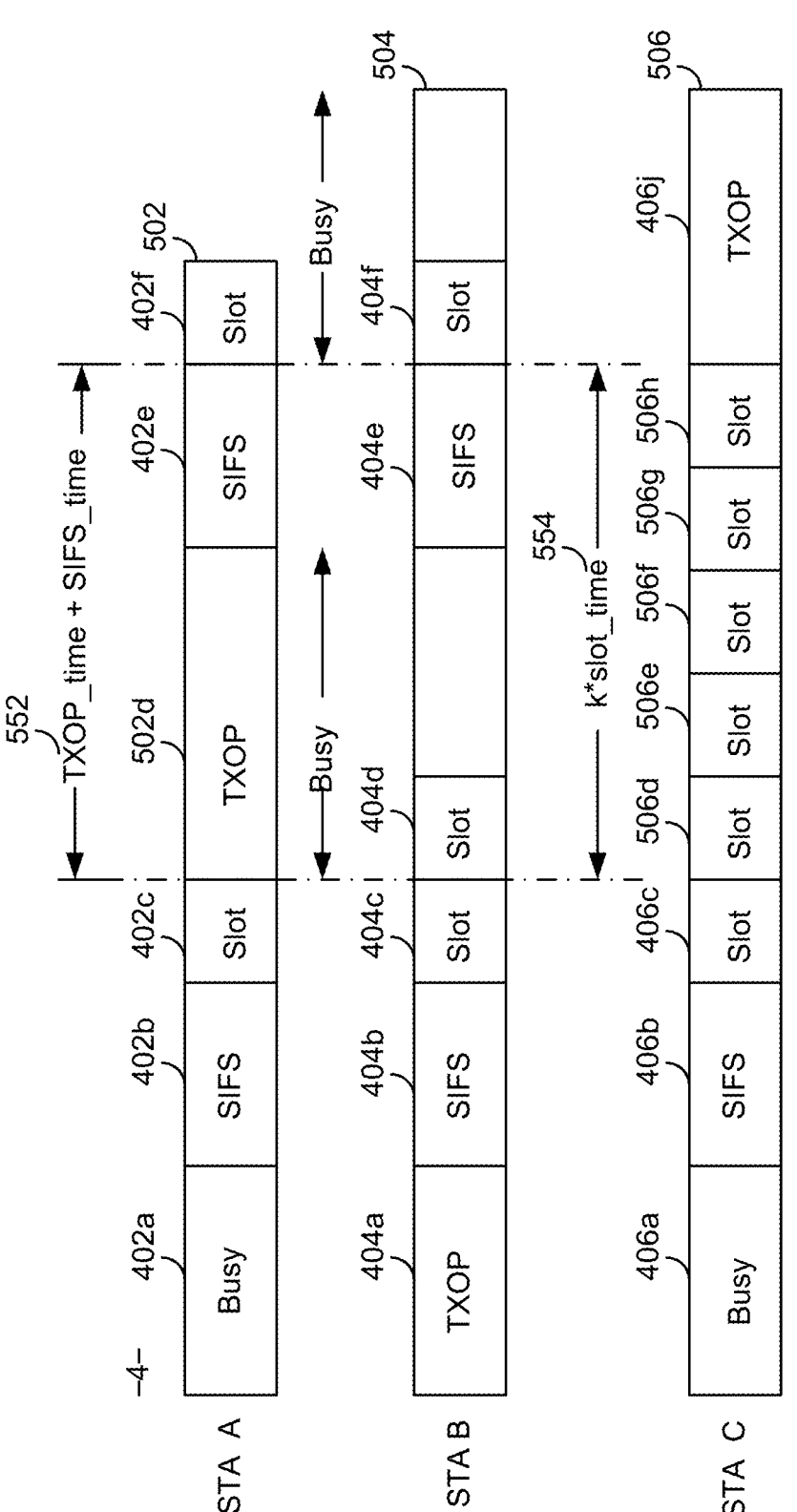
FIG. 5 depicts the example case of FIG. 4 but with the sum of the transmission opportunity (TXOP) time and the SIFS time being a multiple of the slot time, in an embodiment.

FIG. 5 depicts the example case of FIG. 4 with activity 502 for STA A, activity 504 for STA B, and activity 506 for STA C, but with the sum 552 of the TXOP time 502d and the SIFS time 402e of STA A being a multiple of the slot time 554 of STA C, i.e., TXOP_time+SIFS_time=k*slot_time. If this condition is met, then an out-of-range station in BSS C stays synchronized with the stations in BSS A and B.

There are at least two ways of meeting this condition. A first way is to constrain the transmission time and the SIFS time separately to be a multiple of the slot time. A second way is to constrain the sum of the transmission time and the SIFS time to be a multiple of the slot time.

For example, in the first way, the slot times 402c, 506d-506h are compressed to 8 microseconds (μs) (from 9 μs) like a "shortest slot time" modeled after the "short slot time" introduced in 2.4 GHz; the SIFS times are kept at 16 μs; and the PPDU lengths during the TXOP time 502d are constrained to be a multiple of 8 μs. Alternatively, slot times 402c, 506d-506h are set to 9 μs; the SIFS times are set at 18 μs; and the TXOP time 502d is a multiple of 9 μs.

In an example of the second way, slot times 402c, 506d-506h are set to 8 μs, and sum 552 of the SIFS time plus the TXOP time is set to a multiple of 8 μs. Alternatively, the slot times 402c, 506d-506h are kept at 9 μs, and sum 552 of the SIFS time and PPDU time is set so that the sum is a multiple of 9 μs. In this second example, the SIFS times can be set at 18 μs, and the TXOP time 502d is adjusted to be a multiple of 9 μs, or the SIFS times can be set to 16 μs and the TXOP time 502d adjusted to make the sum a multiple of 9 μs.

In the above cases, the length of the TXOP time is constrained, where implementing the constraint depends on the particular PHY format of the PPDU, such as those depicted in FIGS. 2A-2C.

Figure 6:
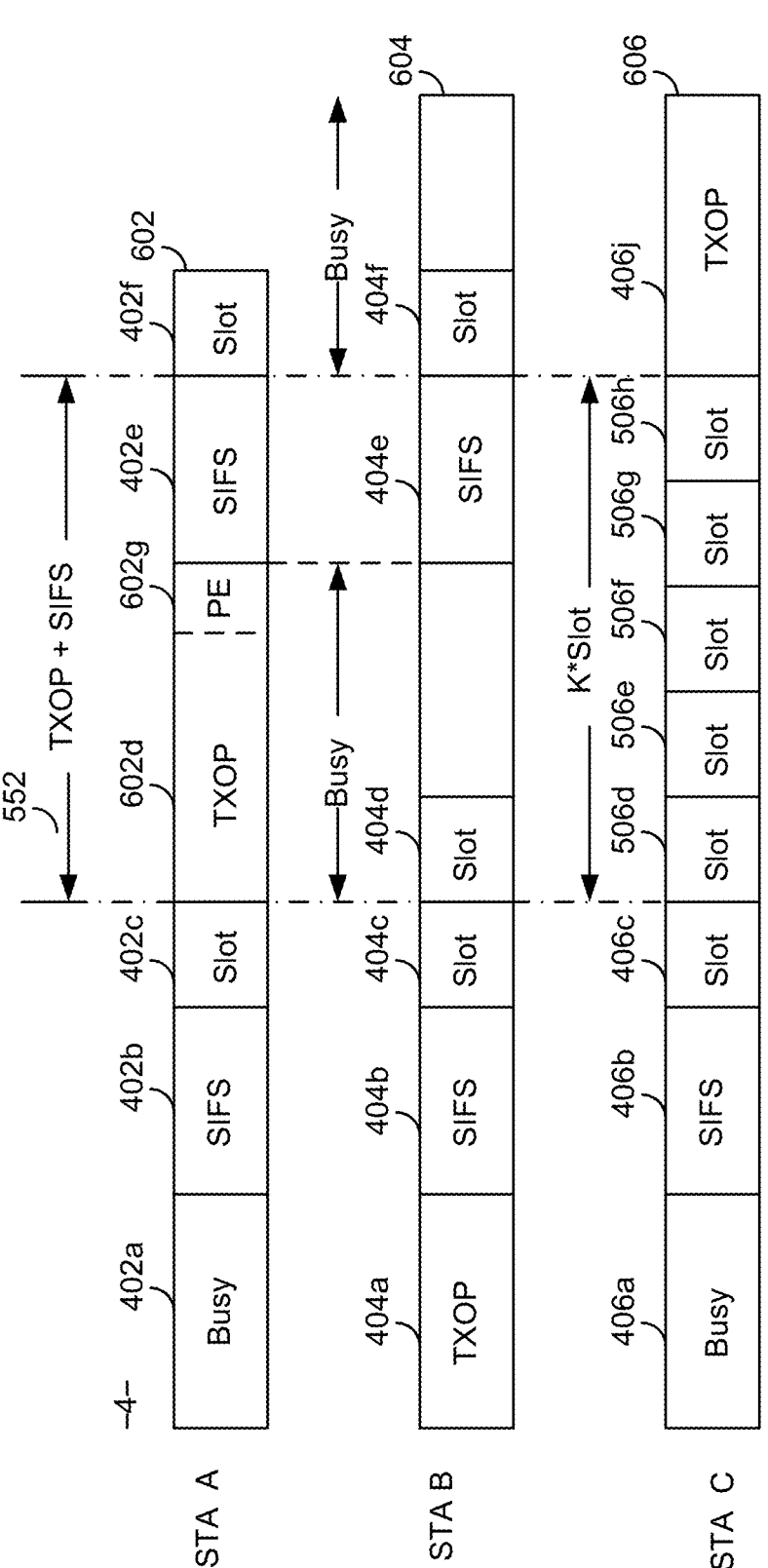
FIG. 6 depicts the case in which a padding extension (PE) is added to the PPDU time to adjust the TXOP time to maintain synchronism, in an embodiment.

FIG. 6 depicts the case in which a packet extension (PE) of 0/1/2/3/4/5/6/7/8 μs is added to the PPDU time to adjust the TXOP time 602d to maintain synchronism, where the PE is an extension to the end of the PPDU with full power. An extension to the end of the PPDU may also be a signal extension which is a final field in the PPDU having a fixed time (OFDM_SIFS–DSSS_SIFS=16 μs–10 μs=6 μs) and having zero power. STA A has activity 602, STA B has activity 604, and STA C has activity 606. A PE is available in formats 252, 254, 256, 258, 260, 262, and 264, depicted in FIGS. 2A-2C, although its resolution is 4 μs, not 1 μsec. With an appropriate PE 602*g* in STA's activity 602, which might involve an extended version of the PE or a signal extension defined heretofore, the sum 552 of the TXOP time plus the SIFS time for STA A becomes a multiple of the slot times 506*d*-506*h* of STA C, thereby maintaining synchronization. In other formats, such as PPDU formats 202 and 204, especially when the slot time is chosen to be 8 μsec, varying the number of LTF symbols can maintain synchronism.

Figure 7:
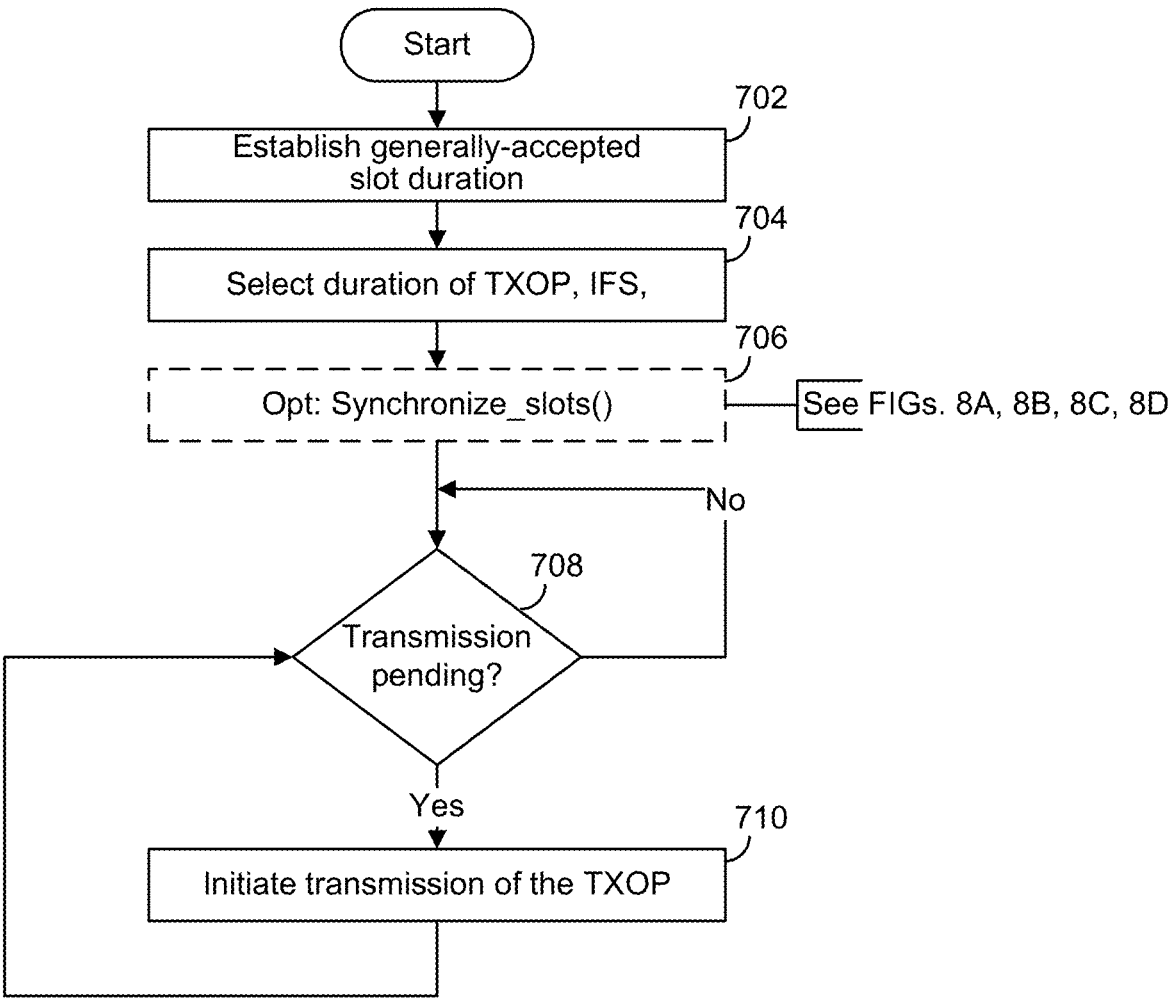
FIG. 7 depicts a flow of operations for a station, in an embodiment.

FIG. 7 depicts a flow of operations for a station, in an embodiment. In step 702, slots of the BSS are optionally synchronized by performing a Synchronize_slots( ) function whose instances are described in more detail in FIGS. 8A-8C. In step 702, a generally-accepted access slot duration is established. In step 704, the duration of a TXOP and interframe spacing are selected. In step 706, the slots are synchronized according to FIGS. 8A-8D. In step 708, a station determines whether a transmission is pending (i.e., whether it has data to be transmitted.) If so, in step 706, the station selects the duration of the TXOP, the IFS, and the backoff slots as described above. In step 710, the station initiates transmission of the TXOP.

For the embodiments above, the changes can all be made in implementations with radio center frequencies 1-2.4 GHz or in the new "greenfield" spectrum, with frequencies such as 2.5-5.15 GHz, 5.35-5.47 GHz, or 7.125-24 GHz, with a design goal of minimizing padding.

APs operating with a center frequency of 6 GHz can enforce the slot boundaries using trigger-based uplink transmissions. Standards-based or vendor-specific signaling may be introduced, indicating the requirement to adhere to the slot boundaries if a client device chooses to perform single-user uplink transmissions. Otherwise, the clients can be mandated not to assert uplink_multiuser_disable "ULMU_disable" to be available to receive trigger frames (and potentially use "AIFSN 0" to prevent timeout).

In one embodiment, the inverse fast Fourier transform (IFFT), used in OFDM modulation block 174 of FIG. 1C, with output duration Tau, the range of guard intervals Gj, and the SIFS time, etc., are co-designed. For example, Gj=j*slot_time, Tau=K*slot_time for some constant K, and the SIFS_time=L*slot_time for some integer L, although it may be less desirable to have the guard interval be a multiple of the slot time.

FIGS. 8A-8D depict a flow of operations for synchronizing the slot boundaries among the co-channel APs for deployments with a large number of APs.

Figures 8A, 8B, 8C:
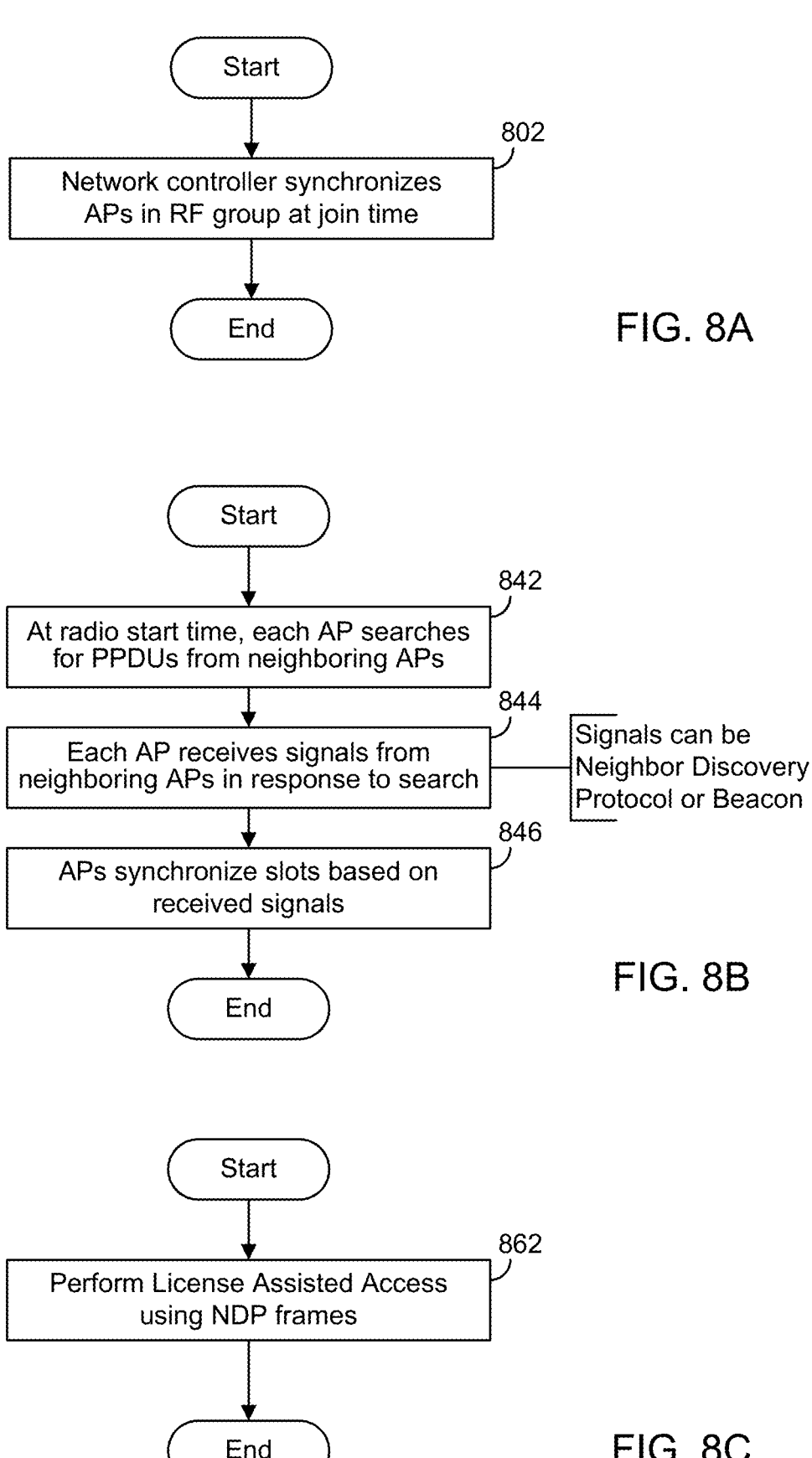
FIG. 8A depicts a flow of operations for a network controller synchronizing slots of stations, in an embodiment.
FIG. 8B depicts a flow of operations for synchronizing slots without a network controller, in an embodiment.
FIG. 8C depicts a flow of operations for synchronizing slots without a network controller, in an embodiment.

FIG. 8A depicts a flow of operations for a network controller synchronizing slots of stations, in an embodiment. In step 802, a central management entity, such as a network controller, enables the synchronization of every AP at join time using protocols such as PTP, gPTP, or NTP (e.g., using hardware timestamps to reduce jitter). The recovered time at the Ethernet interface within each AP is transferred to the MAC subsystem via a hardware signal or software messaging. Slot times are agreed to start whenever the synchronized timebase equals a multiple of the agreed slot time plus an agreed offset. In typical embodiments, the agreed offset equals zero. APs belonging to an RF group are synchronized together.

FIG. 8B depicts a flow of operations for synchronizing slots without a network controller, in an embodiment. In step 842, at radio start time, each AP radio searches for frames bearing timing information from neighboring APs. The timing information can be the timing synchronization function (TSF) timer sent in Beacons or a similar field sent in proprietary frames as the Neighbor Discovery Protocol. In step 844, each AP receives frames from neighboring APs in response to the search. In step 846, the APs synchronize slots using the received frames from the neighboring APs, such as the Neighbor discovery protocol (NDP) or a Beacon. For instance, an AP might be elected leader based on multiple factors such as connectivity, a tie-breaker parameter such as MAC address, etc. Neighboring APs synchronize to that AP, and neighbor-of-neighbor APs synchronize to those neighboring APs, and so forth. Slot times are agreed to start whenever the synchronized timebase equals a multiple of the agreed slot time plus an agreed offset. In typical embodiments, the agreed offset equals zero.

FIG. 8C depict a flow of operations for synchronizing slots without a WLAN network controller, in an embodiment. In a distributed network with no central WLAN management, an AP uses, in step 862, another system, such as License Assisted Access (LAA), to carry timing information to the APs to achieve slot synchronization. Slot times are agreed to start whenever the synchronized timebase equals a multiple of the agreed slot time plus an agreed offset. In typical embodiments, the agreed offset equals zero.

Figure 8D:
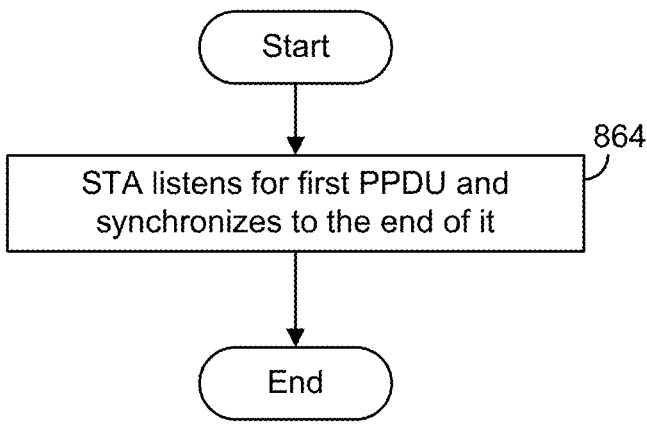
FIG. 8D depicts a flow of operations in which the wireless transmissions are assumed to be synchronized.

FIG. 8D depicts a flow of operations in which the wireless transmissions are assumed to be synchronized already, so hearing one transmission in step 864 enables new APs to acquire that synchronization. Although there may be small drifts between STAs, these tend to average out, especially if every AP is transmitting fairly regularly (e.g., via its beacons).

In sum, the embodiments herein improve the design of 802.11 CSMA/CA to reduce collisions via better slot synchronization, especially in environments with overlapping BSSs (OBSS).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer-readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of maintaining slot time synchronization among a plurality of stations connected to a wireless medium, the method comprising:

selecting, at a first station of the plurality of stations, durations of physical protocol data units (PPDUs) within a transmission opportunity (TXOP) and durations of interframe spacing times within and following the TXOP so that a sum of the durations of the PPDUs and the interframe spacing times is an integer multiple of a slot time; and initiating, at the first station, transmission of the PPDUs of the TXOP with the selected durations over the wireless medium.

2. The method of claim 1, wherein the interframe spacing times are short interframe spacing times.

3. The method of claim 1, wherein the slot time is 8 microseconds.

4. The method of claim 1, wherein the slot time is 9 microseconds.

5. The method of claim 1, wherein selecting the duration of the PPDUs within the TXOP includes adding a signal extension or packet extension to at least one of the PPDUs in the TXOP.

6. The method of claim 1, wherein a network controller is coupled to a plurality of access points and the network controller synchronizes the plurality of access points.

7. The method of claim 1, wherein the plurality of stations includes a first access point and a second access point, wherein the first station is the first access point;

further comprising: prior to initiating the TXOP, searching, by the first station, for frames in PPDUs from the second access point;

receiving, at the first station, frames in PPDUs from the second access point in response to the searching; and synchronizing, at the first station, the slot times based on timing information in the received frames.

8. An access point for maintaining slot synchronization, the access point comprising:

a processor; and a memory coupled to the processor, the memory containing instructions, which, when executed by the processor, cause the access point to:

select durations of physical protocol data units (PPDUs) within a transmission opportunity (TXOP) and durations of interframe spacing times within and following the TXOP so that a sum of the durations of the PPDUs and the interframe spacing times is an integer multiple of a slot time; and initiate transmission of the PPDUs of the TXOP with the selected durations over a wireless medium to one of a plurality of stations coupled to the wireless medium.

9. The access point of claim 8, wherein the interframe spacing time is a short interframe spacing time.

10. The access point of claim 8, wherein the slot time is 8 microseconds.

11. The access point of claim 8, wherein the slot time is 9 microseconds.

12. The access point of claim 8, wherein the instructions to cause the access point to select the duration of the PPDUs within the TXOP includes adding a signal extension or packet extension to at least one of the PPDUs in the TXOP.

13. The access point of claim 8, further comprising:

another access point coupled to the wireless medium; and a network controller coupled to the access point and the another access point;

wherein the network controller synchronizes slot times of the access point with slot time of the another access point.

14. The access point of claim 8, further comprising another access point coupled to the wireless medium;

wherein the access point is further configured to: prior to initiating the TXOP, search for frames from the another access point;

receive frames from the another access point in response to the searching; and synchronize the slot times based on timing information in the received frames.

15. A non-transitory computer-readable medium encoding instructions, which, when executed by a processor of an access point coupled to a wireless medium, cause the access point to:

select durations of physical protocol data units (PPDUs) within a transmission opportunity (TXOP) and durations of interframe spacing times within and following the TXOP so that a sum of the durations of the PPDUs and the interframe spacing times is an integer multiple of a slot time; and initiate transmission of the PPDUs of the TXOP with the selected durations over the wireless medium to one of a plurality of stations.

16. The non-transitory computer-readable medium of claim 15, wherein the interframe spacing time is a short interframe spacing time.

17. The non-transitory computer-readable medium of claim 15, wherein the slot time is 8 microseconds.

18. The non-transitory computer-readable medium of claim 15, wherein the slot time is 9 microseconds.

19. The non-transitory computer-readable medium of claim 15, wherein the TXOP includes one or more physical protocol data units (PPDUs); and wherein the instructions to cause the access point to select the duration within the TXOP include instructions to cause the access point to add a signal extension or packet extension to at least one of the PPDUs in the TXOP.

20. The non-transitory computer-readable medium of claim 15, wherein another access point is coupled to the wireless medium and a network controller is coupled to the access point and the another access point; and wherein the network controller synchronizes slot times of the access point with slot times of the another access point.

* * * * *